United States Patent [19]

Lundén et al.

[11] Patent Number: 4,526,310

[45] Date of Patent: Jul. 2, 1985

[54] PROCEDURE AND DEVICE FOR THE APPLICATION OF A LABEL TO AN ARTICLE

[76] Inventors: Bengt Lundén, Björkhagsvägen 27, S-186 Vallentuna; Tord Pettersson, Skolvägen 2, S-182 Enebyberg, both of Sweden

[21] Appl. No.: 481,283

[22] Filed: Apr. 1, 1983

[30] Foreign Application Priority Data

Apr. 1, 1982 [SE] Sweden ............................ 8202105

[51] Int. Cl.$^{3}$ .................... A43D 69/00; B23P 19/02; B23P 19/04

[52] U.S. Cl. .................................... 227/67; 227/43; 227/120; 29/235; 29/241; 29/433

[58] Field of Search .................... 227/18, 43, 67, 120; 29/235, 241, 433, 450, 754

[56] References Cited

U.S. PATENT DOCUMENTS

| | | | |
|---|---|---|---|
| 2,331,252 | 10/1943 | Van Tuyl | 227/76 |
| 3,022,508 | 2/1962 | Ruskin | 227/3 |
| 3,319,864 | 5/1967 | Adams | 227/120 X |
| 3,385,498 | 5/1968 | Downie | 227/18 |
| 3,598,025 | 8/1971 | Cotton | 227/67 X |
| 3,898,725 | 8/1975 | Carter | 227/3 |
| 3,985,067 | 10/1976 | Livio et al. | 93/88 |
| 4,033,499 | 7/1977 | Butler | 227/43 X |
| 4,323,183 | 4/1982 | Duchin | 227/67 X |
| 4,416,407 | 11/1983 | Bone | 227/67 |
| 4,424,929 | 1/1984 | Weis | 227/120 X |

*Primary Examiner*—Paul A. Bell
*Assistant Examiner*—Taylor J. Ross
*Attorney, Agent, or Firm*—Nils H. Ljungman

[57] ABSTRACT

Procedure and device for application of a label to an article by means of an elastic fastening element. A label is separated from a magazine and conveyed via a guide towards a tube-shaped slit needle. The label is passed along the tip of the needle until the latter penetrates a pre-punched hole in the label. Thereafter, the label is withdrawn, threaded on the needle, and partly back into the magazine where it is retained. The tip of the needle is pressed through an article whereupon a retaining element is separated from a stem and its head is passed through the needle and thus also through the label and the article. When the needle is removed from the article the label remains hanging, anchored in the retaining element.

8 Claims, 27 Drawing Figures

Fig.8
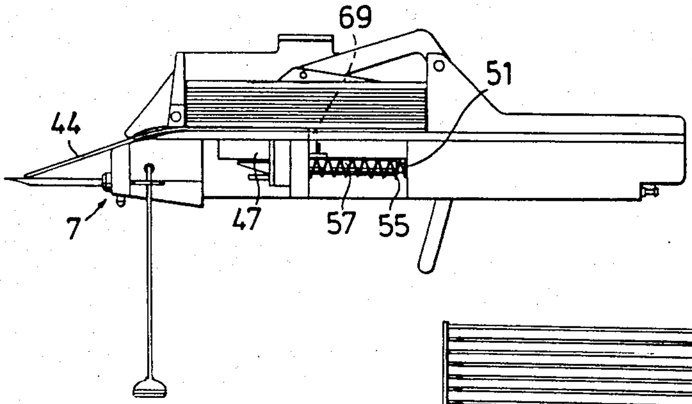
Fig.9
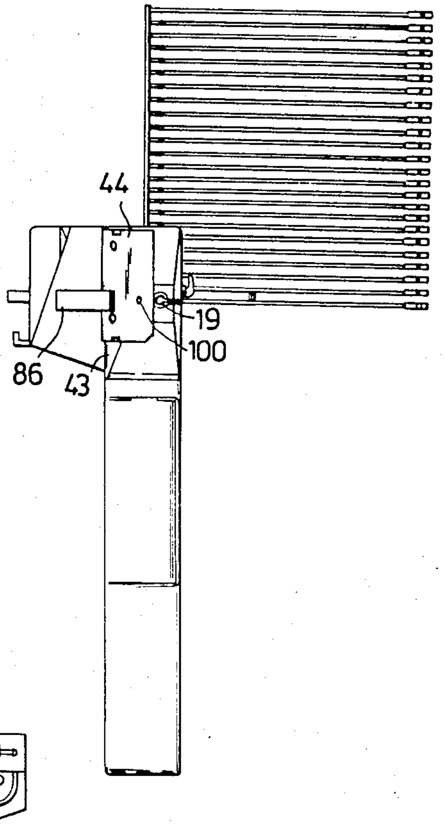
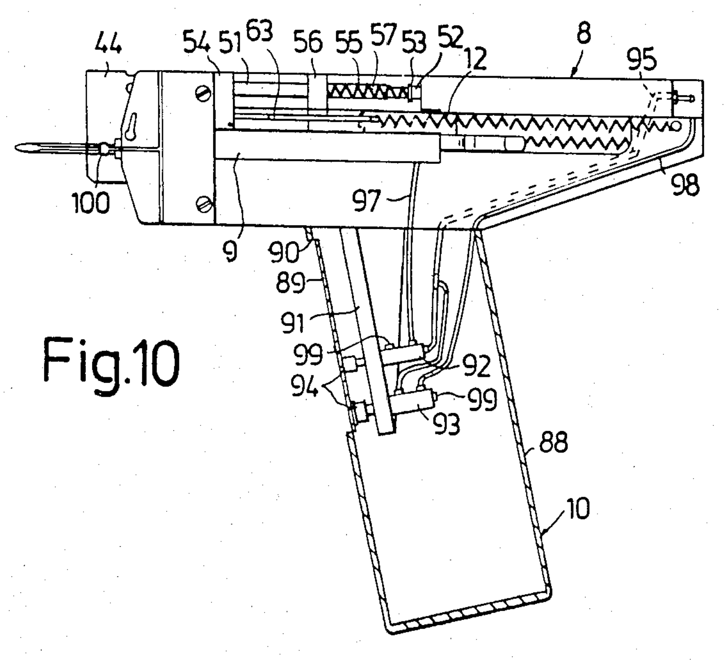
Fig.10

A - A

B - B

Fig. 21
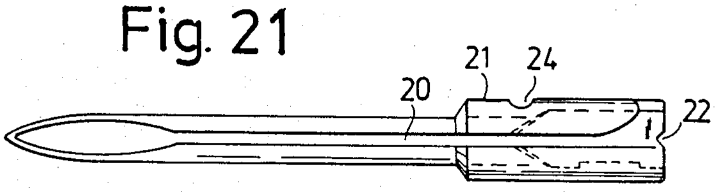
Fig. 22
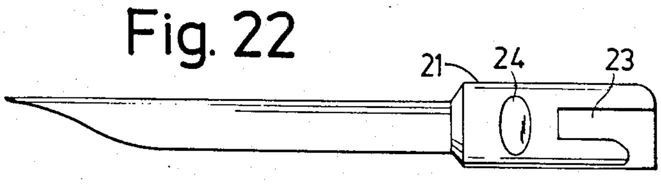
Fig.23
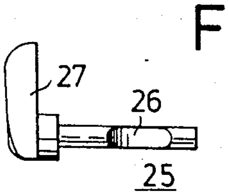
Fig. 24
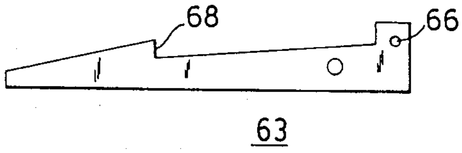
Fig. 26
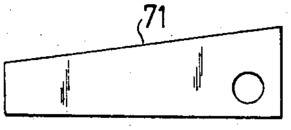
Fig. 25
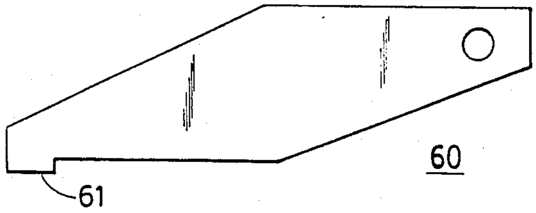
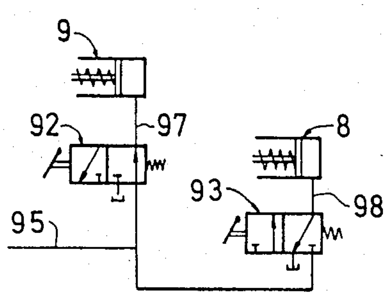
Fig. 27

PROCEDURE AND DEVICE FOR THE APPLICATION OF A LABEL TO AN ARTICLE

FIELD OF THE INVENTION

The invention relates to a procedure and a device for the application of an indicia bearing member, such as a label, or the like, made of cardboard, plastic, rigid woven fabric, or a comparable material to an article by means of a fastening element.

BACKGROUND OF THE INVENTION

It has been the conventional practice in attaching labels to merchandise to utilize what is usually called a fastening gun. In the operation of such a device, the operator removes a preprinted label from a package of labels, threads the label onto the needle of a fastening gun and then applies the label to the article. The operator of such a device must use both hands in order to align the label with the fastening gun needle. Consequently, the operator is unable to hold the article to be labeled throughout the entire labeling procedure. Moreover, the operator must take care in the orientation of the fastening gun so that the needle does not point downwardly, for the label would drop off the needle. It has been disclosed that a material feeding mechanism can be incorporated with a fastening device in U.S. Pat. No. 3,385,498 to William Downie. This document teaches a staple gun with a tab dispenser magazine. The magazine is mounted on the front of the staple gun. A tab tape is guided from the magazine and fed into the work as the user operates the staple gun. The tabs are disposed between the work and the staple gun such that the ejected staple passes first through the tab and then into the work. The tab serves to increase the staple's holding power, provide a cushion effect during stapling, and otherwise, minimize staple related damage.

The present invention utilizes an indicia bearing member which is fed onto the penetrating member of the device prior to the insertion thereof into the work or article, so that the actual alignment of the indicia bearing member is effected completely independently from the attachment process. Moreover, the present apparatus requires no separate physical manipulation of the indicia bearing member or label during operation and the entire device can be removed from the article without loss of alignment between the label and the penetrating member. Such movement cannot be accomplished with the device taught in the Downie Patent.

It is an object of the present invention to provide a new and simpler means of marking an article so that only one of the operator's hands is required to operate the fastening gun, so that the label is retained on the needle even if the needle is pointing downwards and so that no great force is required to use the fastening gun.

It is another object of this invention to provide an apparatus for the application of labels or the like to an article, the apparatus having a magazine for the labels and a magazine for the fastening elements.

It is still another object of this invention to provide a label attaching device which is lightweight and compact, and which can be pneumatically actuated.

SUMMARY OF THE INVENTION

The invention is a procedure and a device for the attachment of a label with a pre-punched hole to an article with a fastening element having a flexible foot as a part therein. The apparatus includes a frame member with a nose section and a tube-shaped, longitudinally slit needle removably mounted in, and projecting from, the nose section. A storage means for retaining a plurality of fastening elements therein is integral with the frame member. A feeder means is operably associated with the storage means for selecting and passing one fastening element from the plurality thereof through the center of the tube-shaped needle. A magazine is attached to the frame and retains therein a plurality of the labels. A reciprocating label feed mechanism is operably associated with both the label magazine and the fastening element feeder means. The label feed mechanism selectively feeds at least one label from the magazine by means of a label guide formed in the frame member towards the needle. The label's hole is fitted over the needle by the feed mechanism.

According to the procedure of this invention, a tube-shaped, longitudinally slit needle is inserted through the pre-punched hole in a label. The needle is then pressed through the article so that the tip of the needle penetrates through to the opposite side of the article. A fastening element is inserted into the tube-shaped needle so that the fastening element passes through the label mounted on the needle and the article such that the fastening element head is oriented at the tip of the needle. The needle is then withdrawn from the article causing the head of the fastening element to be retained on the opposite side of the article. Thus both the fastening element and label are retained in the article.

BRIEF DESCRIPTION OF THE DRAWINGS

The above, as well as other features and advantages of the invention, will be more readily appreciated through consideration of the detailed description in conjunction with the accompanying drawings in which:

FIG. 3 is a plan view of a typical indicia bearing member such as a label or the like;

FIG. 8 is a top plan view of the apparatus illustrated in FIG. 7;

FIG. 9 is a front elevational view of the apparatus illustrated in FIG. 7;

FIG. 10 is a cross-sectional, side view of the instant invention with a label threaded into the needle thereof prior to the attachment of the label to an article;

FIG. 21 is a side elevational view of the injector needle of the present apparatus;

FIG. 22 is a top plan view of the injector needle;

FIG. 23 is a detailed view of the locking pin of the present apparatus;

FIG. 24 is a detailed view of the attachment hook of this apparatus;

FIG. 25 is a detailed view illustrating the return hook;

FIG. 26 is a detailed view of the feed hook of this apparatus; and

FIG. 27 is a schematic diagram of the pneumatic circuit of this apparatus, all in accordance with the teachings of this invention.

DETAILED DESCRIPTION OF THE INVENTION

This invention provides a procedure and a device for application of a label of cardboard, plastic, rigid woven fabric or comparable material to an article by means of an elastic fastening element provided with a head. A label is secured in a pre-punched hole on a tube-shaped, longitudinally slit needle, whereupon the needle is pressed through the article so that the tip of the needle completely penetrates through the opposite side of the article. A fastening element is then separated from a holder and the head of the fastening element is passed through the needle and thus also through the label and the article, being oriented across the needle at the tip of the needle. When the fastening element has thus been secured in the article, the needle is withdrawn from the article, whereupon the fastening element with label attached is removed from the needle and remains hanging in the article.

Using the device according to the invention, price tags, labels with quality statements, etc., can be attached to garments, rugs, curtains, and similar articles that can be penetrated by the needle and on which it is desired to attach a removable information carrier. The device is also usable for holding together a number of units such as material samples.

Figure 1:
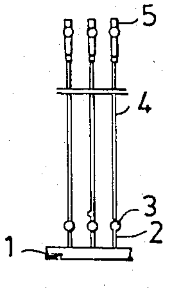
FIG. 1 is a side elevational view of several fastening elements which can be utilized by the apparatus and process of the present invention.
Figure 2:
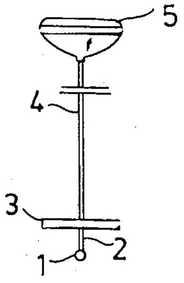
FIG. 2 is a front elevational view of a typical fastening element.

The fastening apparatus of this invention utilizes conventionally available fastening elements, preferably made of an elastic, flexible material such as nylon. An example of such a fastening element, which can be used to advantage in the present invention is illustrated in FIGS. 1 and 2 and indicated by the reference character 2. Typically, these fastening elements 2 are attached to a stem 1 which may hold fifty or more of such fastening elements 2. The fastening element 2 consists of a head 3, an intermediate section 4 and a foot 5. During a marking operation, the fastening element 2 is separated from the stem 1 in that the fastener 2 is cut through adjacent to the head 3.

Figure 4:
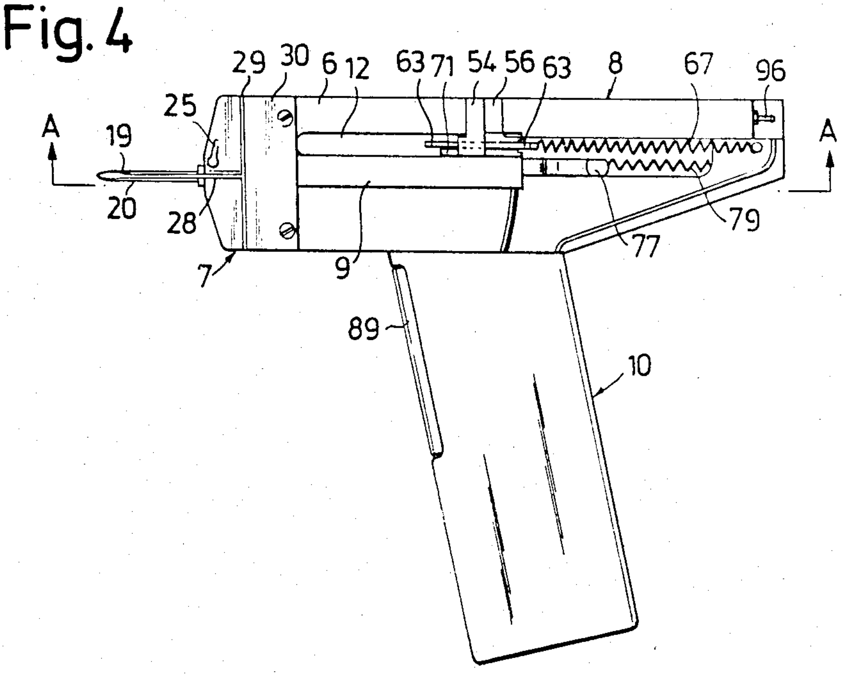
FIG. 4 is a side elevational view of the label attaching device of this invention in a "ready to operate" position.
Figure 5:
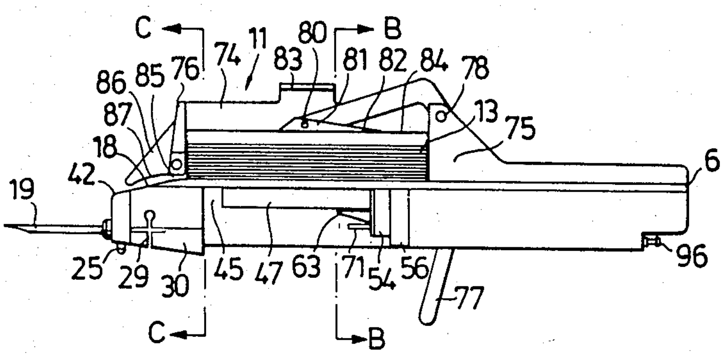
FIG. 5 is top plan view of the apparatus in a "ready to operate" position.
Figure 6:
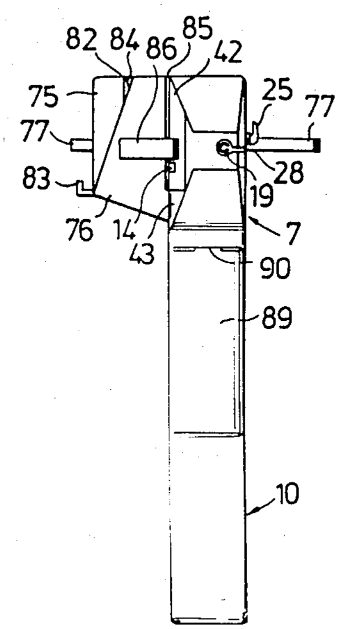
FIG. 6 is a front elevational view of the apparatus in the "ready to operate" position.

The apparatus of this invention is illustrated in FIGS. 4 through 6 and includes a frame 6 to which is attached a nose section 7, a feed mechanism 8, an ejector unit 9, a gun grip 10, and a label magazine 11. Each of these components are described in detail in the following paragraphs.

Figure 15:
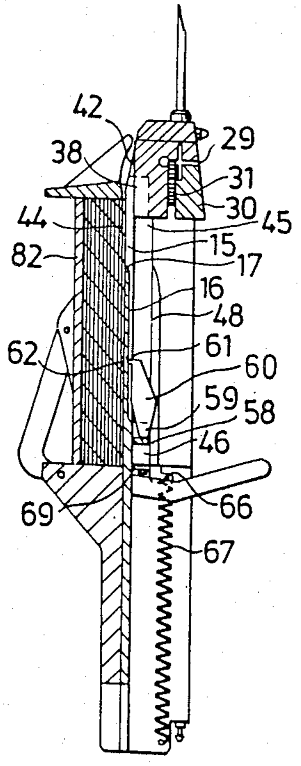
FIG. 15 is a section along line A—A of FIG. 4.
Figure 16:
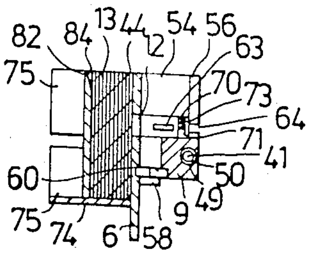
FIG. 16 is a section along line B—B of FIG. 5.
Figure 17:
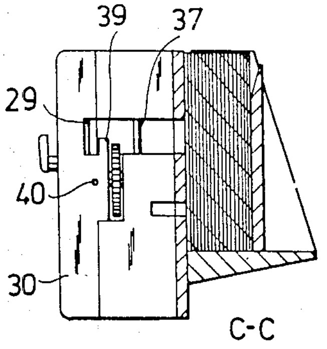
FIG. 17 is a section along line C—C of FIG. 5.
Figure 18:
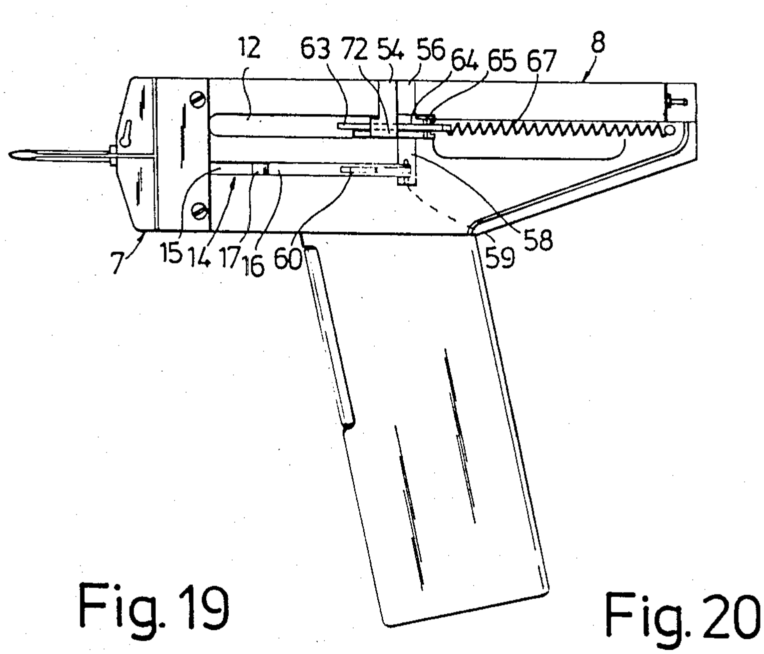
FIG. 18 is a side elevational view of the apparatus of this invention with the ejector unit and feed hook removed.

In the frame 6, there is a groove 12 oriented in the lengthwise direction of the device largely between the shorts sides of a plurality of labels 13 stored in the magazine. This groove 12 is preferably machined into the frame 6 near the magazine 11. Disposed in the frame 6 parallel with this groove 12, is a second groove 14, which is terminated just in front of the magazine at the nose section 7. The groove 14 comprises a milled section 15, a section 16 milled down to roughly half the stock thickness, and a wedge-shaped transition 17 (see especially FIG. 15 and FIG. 18). Further, behind the ejector unit 9, a hole (not illustrated) is made in the frame 6 for a lever mechanism for the magazine 11 which will be described hereinafter. The frame 6 is terminated at the nose section 7 with a chamfer 18 having a height corresponding to the width of one label.

Detachably inserted in the nose section 7 is a tube-shaped needle 19. The needle 19 is provided in its lengthwise direction with a slit 20 that also extends through the needle head 21 as shown in FIG. 21 and FIG. 22. A cutting edge 22 is provided at the rear edge of the needle head 21 and diametrically opposite the slit 20. A core-out 23 made in the upper side of the needle head 12 enables half the head 3 of a fastening element 2 to be fed down into the needle 19. A semi-circular groove 24 is also made in the upper side of the needle head 21. The needle head 21 is insertable into a corresponding hole in the nose section 7 and is retained in place by a locking pin 25 in a drilled passage intersecting the hole. The locking pin 25 according to FIG. 23 is made with an arc-shaped groove 26 corresponding to a portion of the outer limiting surface of the needle head 21, enabling the needle 19 to be removed from the needle section and replaced. The locking pin 25 is turned by means of a handle 27.

A groove 28 emanates from the hole on the same plane as the needle slit 20. A cruciform groove 29 runs perpendicularly to the groove 28 with its center at the rear edge of the needle head 21 and in the center line of the needle 19. The cruciform groove 29 is so elaborated that it can contain the stem 1, fastener 2, and head 3 of the fastening element 2 as well as a piece of the intermediate section 4 protruding from the nose section 7. A shaft 32 (see especially FIGS. 16–20) is pivotably mounted in the nose section, which is inside a removable cover plate 30 which delimits a portion of the groove. A drilled passage 33 houses a compression spring 34 that exerts pressure upon the upper portion of a ball 35, causing this to be engaged and locked between a pair of teeth in the gearwheel 31. Disposed beyond the gearwheel 31 is a recess 36 with a pin 37 oriented parallel with the cruciform groove 29. The nose section 7 also contains a milled groove 38 which is aligned with the groove 15 in the frame 6 as described hereinafter. The cover plate 30 is provided with a projection 39 which holds the gearwheel 31 in place and with a guide 40 for an ejector 41 incorporated in the ejector unit 9 and movable along the center line of the needle 19. One front edge of the nose section 7 has a chamfered portion 42 an extention of the corresponding chamfer 18 in the frame 6. The chamfer 42 is terminated in the lower edge with a lug 43 which also serves as a guide for a label 44 as it is fed forward.

An ejector unit 9 is secured to the frame 6 by means of a pair of projections 45 and 46 in the immediate vicinity of the nose section 7 and disposed in the direction of the needle 19. An open groove 47 is thus delimited by the ejector unit 9, the projections 45 and 46 and the frame 6. The upper side of ejector unit 9 lies on the same level as the lower edge of the groove 12 in the frame 6 and the lower side of the ejector unit 9 lies on the same level as the lower edge of the groove 14 in the frame 6. Further, a groove 48 of the same height as, and opposite to, the groove 14 is milled in a portion of the lower side. In addition to the ejector 41, the ejector unit 9 comprises a piston (not shown) attached to the ejector 41 and movable within a cylinder 49. The ejector 41 is in the shape of an elongated rod with a diameter corresponding to the inside diameter of the needle 19. Disposed around the ejector 41 is a compression spring 50 which rests partly against the piston (not shown) and partly against the nose section 7.

The feed mechanism 8 comprises a cylinder and a piston (not shown) movable inside the cylinder 49. Secured in the piston is a rod 51 with a thickening 52 on which a spring stop 53 is formed. A feed head 54 is attached to the other end of the rod 51. A slide 56 actuated by compression spring 55 is disposed between the thickening 52 and the feed head 54. This slide 56 is mounted on a sleeve 57 which is movably mounted on the rod 51. The feed head 54 and the slide 56 are slidable towards both the upper side of the ejector unit 9 and the frame 6 above the groove 12. Protruding from the slide 56 down into and interacting with the groove 47 is a pin 58 which at one end supports a return hook 60 that is turnable around a shaft 59—see FIG. 18. Shown in FIG. 25 is the return hook which in its free end is elaborated with a pin 61 which is intended to penetrate into and interact with the punched hole 62 in the label. The return hook 60 runs in and is guided partly by the groove 14 in the frame 6, partly by the groove 48 in the ejector unit 9 and partly by the groove 38 in the nose section 7. Further, a retaining hook 63 is pivotably disposed in a slot 64 and around a shaft 65 in the slide 56. Disposed in a hole 66 in a protruding portion of the retaining hook 63 is a draw spring 67 (see FIG. 24). The draw spring 67 is also attached to the frame 6 and serves partly as a return spring for the feed mechanism 8 and partly as a spring member which endeavors to turn the retaining hook 63 counter-clockwise (viewed from above). The retaining hook 63 is also furnished with a lug 68. In the rear edge of the slide 56 is an additional lug 69 which, through the groove 12 in the frame 6, pushes into the magazine 11 a distance equivalent to the thickness of one label 44. If simultaneous discharge from the magazine 11 of more than one label 44 is desirable, the lug can be replaced by one of corresponding length.

Provided in the feed head 54 is a core-out in which the retaining hook 63 can be inserted entirely. The slide 56 is locked to the feed head 54 in that the draw spring 67 endeavors to turn the retaining hook 63 counter-clockwise, whereupon the lug 68 of the retaining hook 63 is brought to engagement with the front edge of the feed head 54. Adjacent to the core-out in the feed head 54 is a core-out 70 in which a feed hook 71 is pivotably mounted on a horizontal shaft 72. The feed hook protrudes out of the feed head 54 and is brought into contact with the upper side of the ejector unit 9 by a compression spring 55 secured in the core-out and acting against the feed hook 71 (see particularly FIG. 16).

The label magazine 11, which is placed generally alongside the ejector unit 9 and close to the opposite side of the frame 6, consists of a bottom 74 attached at right angles to the frame 6, an end plate 75 oriented at the feed mechanism 8 drive source, and an end plate 76 fitted at the nose section 7. A lever 77 is pivotably mounted on a shaft 78 in the rear end plate 75 and protrudes through a hole in the frame 6 out onto the opposite side of the device. A draw spring 79 attached to both the lever 77 and the frame 6 endeavors to turn the lever 77 counter-clockwise as viewed from above. By means of a pin 80, the other end of the lever 77 is rotatably mounted between a pair of lugs 81 on a movable plate 82 in the magazine 11. The movement of the plate 82 away from the frame 6 is limited by a stop 83 formed in the bottom 74 of the magazine 11. To facilitate refilling of the magazine 11 with labels 13, the upper edge of the plate 82 has a chamfer 84.

Disposed between the front end plate 76 of the plate 82 and the frame 6 is a slot 85 of a thickness of one label. In association with the slot 85, a guide profile 86 is attached to the end plate 76. The guide profile has an arc-shaped section 87 which is disposed above the lug 43 in the nose section 7 for steering of a label 44 discharged from the magazine 11 towards a needle 19.

The gun grip 10 of the device consists of a casing 88 in which a pawl 89 is pivotably suspended in a joint 90 (see FIG. 10). Provided inside the casing and attached to the frame 6 is a bracket 91. This bracket 91 supports two operating valves 92 and 93. Each operating valve 92 and 93 consists of a pneumatic three-way, two-position valve with a spring-loaded control means 94. When the pawl 89 is pressed in, the valves 92 and 93 are actuated, valve 92 just before valve 93. The valves are connected via a hose 95 with a nipple 96 which is connected to a compressed air source. The valve 92 is connected via a hose 97 to the drive source of the ejector unit 9 and the valve 93 is connected via a hose 95 to the drive source of the feed mechanism 8. Each valve 92 and 93 is also equipped with a nipple 99 for venting of the respective drive source. FIG. 27 shows the pneumatic circuit diagram for the device.

The functioning of the device in conjunction with the marking operation will now be described with reference to the figures in the accompanying drawings.

Figure 7:
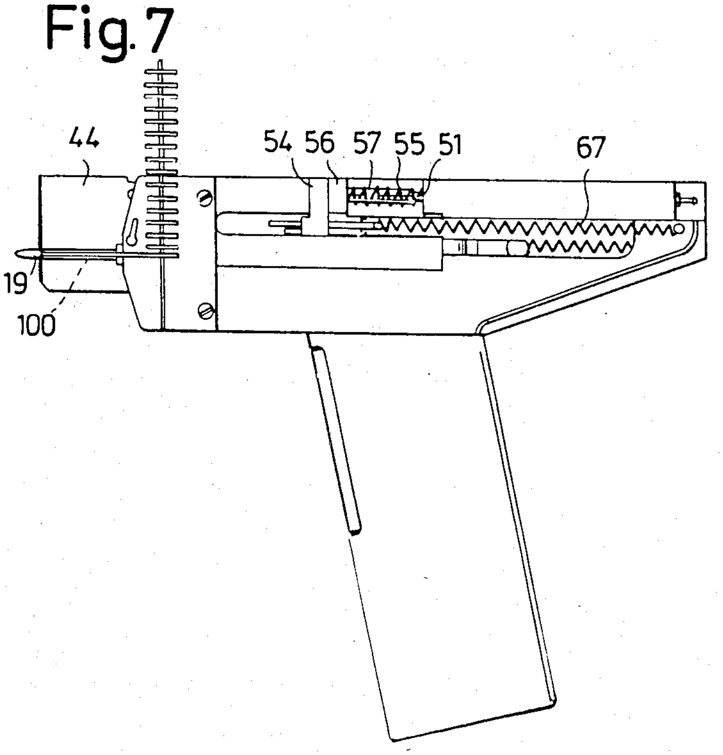
FIG. 7 is a side elevational view of the label attaching device of this invention with the fastening elements during the feeding of a label all in accordance with this invention.
Figure 11:
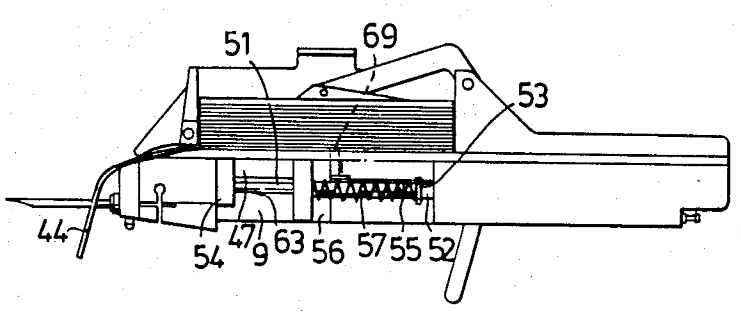
FIG. 11 is a top plan view of the apparatus with label threaded onto the needle as in FIG. 10.

The operator takes hold of the gun grip 10 with his right hand and inserts a stem 1 holding, say, for example, fifty fastening elements 2 into the cruciform groove 29 in the nose section 7 with his left hand (compare FIG. 7). The operator then takes hold with his left hand of a bundle of preprinted labels, presses lever 77 towards the nose section 7 with his right thumb so that the plate 82 in the magazine 11 is brought into contact with the stop 83, pushes the labels down into the magazine 11 and releases the lever 77, whereupon the labels are clamped between the plate and the frame 6 through the action of the spring 79.

The device is now in the condition illustrated by FIGS. 4–6. The drive source of the feed mechanism 8 is pressureless and, consequently, the spring 67 retains the slide 56 fully withdrawn and the lug 69 (in FIGS. 8, 11, 14 and 15) is inserted in a core-out (not shown) in the rear end plate 75. Further, the retaining or fastening hook 63 is inserted into the core-out in the feed head 54 and the lug 68 of the retaining or fastening hook 63 is in engagement with the front edge of the feed head 54, in consequence of which the feed head 54 is locked on the slide 56. It is evident from FIG. 27 that the ejector unit 9 is pressurized and the ejector 41 is pushed forward through the guide 40 in the nose section 7 and through the needle 19 as far as the needle tip.

When the operator presses the pawl 89 in the gun grip 10, operating valve 92 is actuated first, causing the ejector unit 9 to commence to be vented and the spring 50 presses the ejector 41 back into the cylinder 49. Immediately after this, operating valve 93 is acturated and the drive source of the feed mechanism 8 commences to become pressurized. The feed head 54 is then pressed forward by the piston rod 51 along the groove 47. The slide 56, which is locked to the feed head 54, is carried along with this whereupon the lug 69 is inserted into the magazine 11 and presses the innermost label 44 in its longitudinal direction through the slot 85 towards the guide profile 86 and along the lug 43. As this takes place, the label 44 is deflected towards the needle 19 in order to come into contact with the tip of the needle as it continues to be fed forwards. The status of the device is now evident from FIGS. 7–9.

Figure 3:
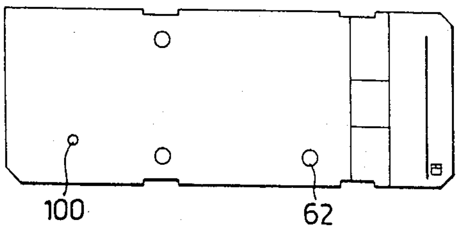

At the same time as the label is deflected towards the needle 19, the pin 61 of the return hook 60 is forced through the groove 15 milled in the frame 6 and into the pre-punched hole 62 in the label 44 which is illustrated in FIG. 3. The pin 61 is now in engagement with the hole during the label's final deflection towards and sliding along the tip of the needle 19.

Figure 12:
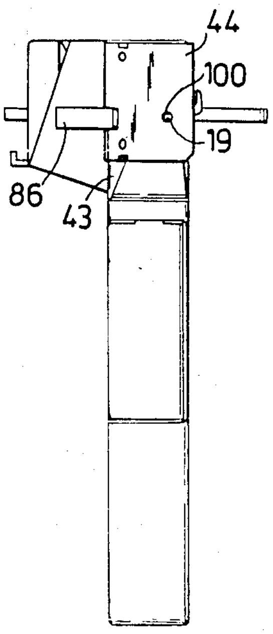
FIG. 12 is a front elevational view of the apparatus of FIG. 10.
Figure 19:
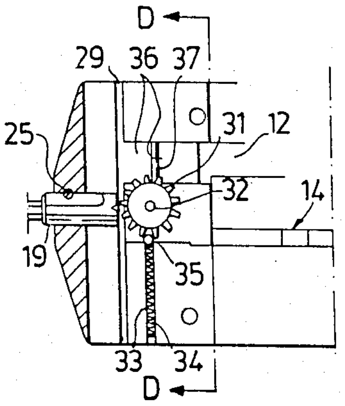
FIG. 19 is partial side elevational view of the apparatus with the cover plate removed.
Figure 20:
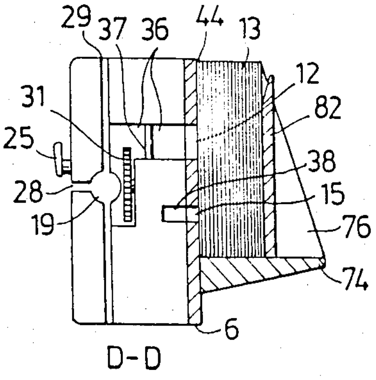
FIG. 20 is a section along line D—D of FIG. 19.

Towards the end of the feed stroke several events occur. The label 44 is carried along the needle 19 so far that the pre-punched hole 100 is in contact with and is penetrated by he outermost tip of the needle 19. The feed hook 71 has been carried along the upper side of the ejector unit 9 to contact with the gearwheel 31, whereupon the front, lower tip of the hook 71 comes into engagement between two teeth and turns the gearwheel 31 counter-clockwise as shown in FIG. 19. The hook 71 is kept in contact with the gearwheel 31 as it turns by the compression spring 73 in the feed head 54. The gearwheel 31 is turned one tooth and locked by the spring-loaded ball 35 disposed below the gearwheel 31 which is in engagement between two teeth. In the cruciform groove 29, the fastener 2 of the lowermost situated fastening element is in mesh with the gearwheel 31, the rotational movement of which causes the fastening element 2 to be brought into a level with the needle 19 and the half head 3 of the retaining element to be inserted into the core-out 23 in the needle head 21. Since the cylinder diameter of the ejector unit 9 is smaller than that of the feed mechanism 8 and in that the operating valve 92 of the ejector unit 9 is actuated before operating valve 93 of the feed mechanism 8 when the pawl 89 is pressed in, the ejector 41 has now been withdrawn so far into the ejector unit 9 that it is out of the way of the fastening element 2. Further, the tip of the fastening hook 63 which retains the slide 56 against the feed head 54 has been inserted into the recess 36 in the nose section 7. The tip touches upon the pin 37 and slides towards the latter whereupon the lug 68 of the fastening hook is turned out of engagement with the front edge of the feed head 54. Against the action of compression spring 55, the draw spring 67 then removes the slide 56 from the feed head 54 so far that the slide 56 comes into contact with the thickening of the piston rod. The return movement of the slide 56 causes the pin 61 of the return hook in the label hole 62 to partially retract the label 44 into the magazine 11 whereupon the label 44 through the hole 100 is threaded onto the needle 19 and drawn back towards the nose section 7. At the end of the return movement of the slide 56, the pin 58 is removed from the label hole 62 as a result of the configuration of the groove 14. The label 44 is retained in the magazine 11 in that the draw spring 79, via the lever 77, presses the plate 82 towards the frame 6. Since the drive source of the feed device 8 is under pressure, the feed head 54 remains in its protruded position. The status of the device is now evident from FIGS. 10–12.

The operator now holds an article 101 with his left hand and presses the needle 19 through that article 101 so that the tip of the needle 19 penetrates all the way out on the opposite side of the article 101.

The operator then releases the pawl 89 in the handle, whereupon operating valve 92 is actuated so that the ejector unit 9 starts to become pressurized while operating valve 93 is also actuated, causing the drive source of the feed mechanism 8 to commence to be vented. During the venting cycle, the spring 67 pulls the slide back to its starting position according to FIGS. 4–6, the slide, via the sleeve 57 and the thickening 52 of the piston rod, being accompanied by the feed head 54. When the slide 56 is in the starting position, the spring 55 presses the piston rod 51 further into the cylinder 49 until the feed head 54 is in contact with the slide 56 and the lug 68 of the fastening hook 63 is thus brought into engagement with the front edge of the feed head 54.

Figure 13:
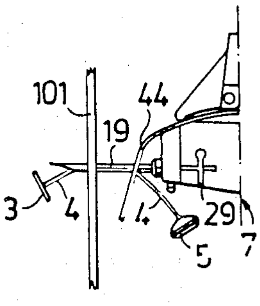
FIG. 13 is a front section, top plan view of the apparatus of this invention illustrating the penetration of the article to be marked and the partial ejecting of a fastening element.
Figure 14:
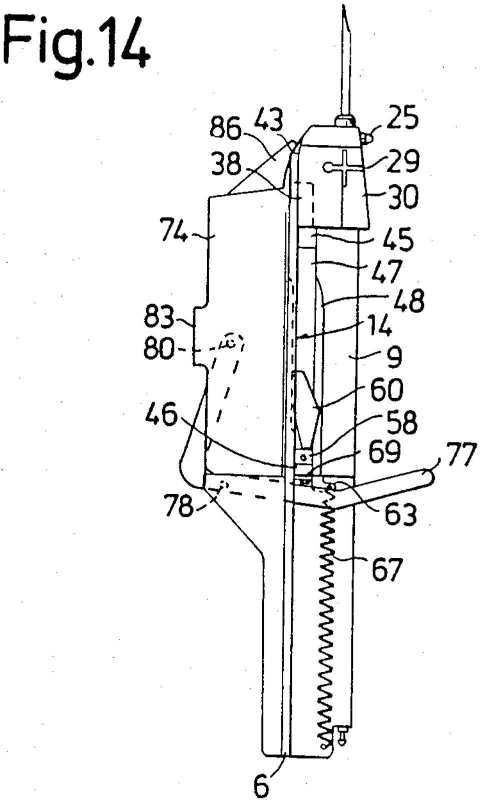
FIG. 14 is a bottom plan view of the apparatus with portions thereof cut away.

In the meantime, the ejector 41 is pressed forwards through the guide 40 towards the head 3 of the fastening element 2 in the needle head 21. The fastening element 2 is pressed against the cutting edge 22, which cuts off the head from the fastener 2 and presses the head through the needle 19. When the head passes through the label hole 100, the intermediate section 4 is deflected towards the needle 19 and accompanies the head through the needle 19 and the article 101. At the needle tip, the head springs out and reassumes its original position in relation to the intermediate section 4, in which position the head 3 is roughly parallel with the article 101 (see FIG. 13).

When the needle 19 is subsequently withdrawn from the article, the head 3 will come into contact with and anchor the fastening element 2 in the article 101. As withdrawal of the needle 19 continues, the foot 5 is drawn towards the hole 100 and the label 44 is withdrawn from the magazine 11. When the needle 19 is finally removed from the article, the fastening element 2 with label 44 attached is left hanging in the article.

The device is now ready for marking of the next article as above, but of course, with the difference that fastening elements 2 and labels 44 are already fitted in the device.

If it is desirable for more than one label to be applied at the same time to an article, the front end plate 76 may be mounted movably, enabling a suitable slot width to be set. Further, the lug 69 of the slide 56 and the pin 61 of the return hook 60 may be adapted accordingly.

The invention as described hereinabove in the context of a preferred embodiment is not to be taken as limited to all of the provided details thereof, since, modifications and variations thereof may be made without departing from the spirit and scope of the invention.

What is claimed is:

1. A method for the application of a label having a first and a second pre-punched hole therein, to an article by means of an elastic fastening element fitted with a head comprising the steps of:

inserting a tube-shaped, longitudinally slit needle through said first pre-punched hole of said label;

pressing said needle through the article so that the tip of the needle penetrates through the opposite side of the article;

inserting said fastening element into said tube shaped, longitudinally slit needle such that said fastening element passes through said label and the article and such that said fastening element head is oriented at the tip of said needle;

withdrawing said needle from the article whereby the head of said fastening element is retained on the opposite side of the article and whereby said fastening element and said label are retained in the article; said step of inserting said needle through said first hole of said label including;

providing a magazine for holding a plurality of the labels therein;

feeding at least one of the labels from said magazine towards the needle wherein at least one of the labels from the magazine is effected by means of a lug protruding into the magazine, which lug presses the label in its longitudinal direction towards a guide means which deflects the label towards the needle until the needle is in contact with the first pre-punched hole in the label; and feeding the label away from the needle by engaging said second hole with a hook means which partially draws the label back into the magazine whereinafter said hook means is disengaged from said second hole.

2. A fastener applying tool for the application of a label, having a first and a second pre-punched hole therein, by means of an elastic fastening element, said tool comprising:

a frame having a nose section at one end thereof;

a tube-shaped, longitudinally slit needle protruding from said nose section, storage means operably associated with said needle to store said fastening elements;

ejector means operably associated with said storage means to pass said fastening elements, one by one, through said needle;

a magazine attached to said frame for holding a plurality of said labels therein; label feeding means comprising:

guide means in said frame;

a lug protruding into said magazine arranged to separate and feed at least one said label from said magazine along said guide means towards said needle, a groove in the frame member, and a pivotable return hook movable along said groove in the frame such that said return hook engages said second pre-punched hole in the label.

3. The tool according to claim 2 wherein the feeding means includes a slide having a protruding pin which is slidable along a first groove defined in part by the frame and in part by the ejector unit; said ejector unit having a lug and wherein the lug of the ejector unit is secured to said slide and is movable in a second groove in the frame and wherein the return hook is carried in the pin and guided by a pair of coinciding grooves in said ejector unit and said frame.

4. The device according to claim 3 wherein the feeding means further includes a drive source with a longitudinally disposed reciprocating disposed rod to one end of which a feed head is attached, and wherein the slide is movably mounted on the rod and is pressed towards the feed head by a compression spring attached to the rod, and wherein a rotatably mounted retaining hook in the slide is arranged to be insertable into a core-out section in said feed head, said slide being detachably mounted to said feed head with a lug by means of a draw spring attached to the retaining hook; and wherein a pin mounted in a recess in the frame nose section is arranged to cause at the end of the forward movement of the feed head, the retaining hook to be disengaged from the feed head whereupon the slide is removable from the feed head.

5. The tool according to claim 4 wherein a feed hook is rotatably mounted in the feed head, which feed head is pressed by means of a spring against the upper side of the ejector unit and is so disposed that upon completion of the forward movement of the feed head, it is in engagement with a gearwheel having at least one tooth mounted in the frame nose section and rotates the at least one tooth towards locking influence by a spring-loaded ball in engagement with the gearwheel so that one of said fastening elements is fed forward to the needle.

6. The tool according to claim 2 wherein the label magazine includes a bottom bracket attached perpendicularly to the frame, a first end plate oriented at a drive source of the feeding means, a second end plate applied to the nose section and a third plate disposed for movement towards and away from the frame, and in that a spring-loaded lever protruding through a hole in the frame is mounted in the first end plate and is rotatably secured through the plate, and wherein a slot of the thickness of one label is provided between the frame and the second end plate which supports a guide profile which is oriented over a lug in the nose section for steering of one of said labels to be discharged from the magazine towards the needle.

7. The tool according to claim 2 wherein the feeding means and a drive source incorporated in the ejector means comprise two pneumatic piston cylinders with return springs; and wherein attached to the frame is a bracket which carries two operating valves, one for each piston cylinder; and wherein a pawl is pivotably suspended in association with the bracket and so disposed that when the pawl is pressed in towards the bracket one operating valve is actuated first and then the other operating valve is actuated.

8. A tool for the application of a label having a first and a second pre-punched hole therein to an article with a fastening element having a flexible head thereon to an article, said apparatus comprising:

a frame member with a nose section;

a tube-shaped, longitudinally slit needle removably mounted in and projecting from said nose section;

storage means integral with said frame member for removably retaining therein a plurality of said fastening elements;

feeder means operably associated with said storage means for passing the head of the fastening element through the needle;

a magazine attached to said frame for retaining therein a plurality of said labels;

a reciprocating label feed mechanism operably associated with said magazine for feeding at least one said label from said magazine towards said needle, said label feed mechanism also being operably associated with said fastening element feeder means whereby said label is positioned so that the first pre-punched hole therein is seated over said needle which then penetrates through the article to the opposite side thereof, and whereby said fastening element is inserted through said needle such that the head thereof extends from the tip of said needle, and wherein the flexible head of said fastening element retains said element in the article and fastens said label to the article;

said feeder means including a groove in the frame member; and a return hook pivotably associated with said feed mechanism and movable along said groove in the frame such that said return hook engages said second pre-punched hole in the label.

* * * * *